US00RE45867E

(19) United States
(12) Reissued Patent
Mayer et al.

(10) Patent Number: US RE45,867 E
(45) Date of Reissued Patent: Jan. 26, 2016

(54) VEHICLE-MOUNTED CONVEYOR SYSTEM INCLUDING POWERED ROTATING INFEED CONVEYOR

(71) Applicant: Putzmeister Inc., Sturtevant, WI (US)

(72) Inventors: Martin G. Mayer, Reutlingen (DE); Terry L. Smith

(73) Assignee: PUTZMEISTER INC., Sturtevant, WI (US)

(21) Appl. No.: 14/287,592

(22) Filed: May 27, 2014

Related U.S. Patent Documents

Reissue of:
(64) Patent No.: 6,378,686
Issued: Apr. 30, 2002
Appl. No.: 09/324,314
Filed: Jun. 2, 1999

(51) Int. Cl.
*B65G 15/22* (2006.01)
*B65G 21/14* (2006.01)
*E04G 21/04* (2006.01)

(52) U.S. Cl.
CPC ..... *B65G 21/14* (2013.01); *E04G 21/04* (2013.01)

(58) Field of Classification Search
CPC ..... B65G 21/14; B65G 41/005; E04G 21/04
USPC ..... 198/311, 314, 316.1, 318, 589
See application file for complete search history.

(56) References Cited

U.S. PATENT DOCUMENTS 1,346,990 A * 7/1920 Stuart ..... 198/589 X
1,431,857 A * 10/1922 Willcox ..... 198/589 X
2,649,185 A * 8/1953 Lichtenberg ..... 198/589 X
2,883,076 A * 4/1959 Palmer ..... 198/589 X
3,598,224 A * 8/1971 Oury ..... 198/311 X
3,656,607 A * 4/1972 Gorgei et al. ..... 198/861.4

(Continued)

FOREIGN PATENT DOCUMENTS

GB 2222995 * 3/1990 ..... 198/311
GB 2222995 A 3/1990

OTHER PUBLICATIONS

Clark Machinery, Inc. Extend-A-Pour brochure. Date: before Jun. 2, 1998, 6 pgs.

(Continued)

*Primary Examiner* — Robert M Fetsuga
(74) *Attorney, Agent, or Firm* — Jansson Munger McKinley & Kirby Ltd.

(57) ABSTRACT

A vehicle-mounted conveyor system including an infeed conveyor assembly mounted for powered rotation relative to the vehicle. The conveyor system includes a discharge conveyor assembly pivotally mounted to a main turret, which in turn is mounted to a primary turntable for powered rotation relative to the vehicle. The discharge conveyor assembly includes a telescoping boom and a moving discharge conveyor belt to supply an aggregate material, such as concrete, to a desired point at the work site. An infeed conveyor assembly is rotatably mounted to the main turret by a powered secondary turntable. The powered secondary turntable is mechanically driven by a drive mechanism, such that the infeed conveyor assembly can be rotated relative to the main turret. The secondary turntable and the primary turntable are independently operable and rotate about a common vertical axis, such that the infeed conveyor assembly and the discharge conveyor assembly can be independently rotated relative to the vehicle.

9 Claims, 6 Drawing Sheets

(56) References Cited

U.S. PATENT DOCUMENTS

| | | | | | |
|---|---|---|---|---|---|
| 3,945,484 | A | | 3/1976 | Oury | |
| RE29,110 | E | | 1/1977 | Oury | 198/314 |
| 4,392,776 | A | * | 7/1983 | Shum | 414/744.5 |
| 4,523,669 | A | | 6/1985 | Smith | 198/313 |
| 4,624,357 | A | | 11/1986 | Oury et al. | 198/313 |
| 4,924,993 | A | * | 5/1990 | Buxton | 198/311 |
| 5,086,704 | A | * | 2/1992 | Mueller | 104/44 |
| 5,203,442 | A | | 4/1993 | Oury et al. | 198/313 |
| 5,360,097 | A | | 11/1994 | Hibbs | 198/313 |

OTHER PUBLICATIONS

Clark Machinery, Inc. Extend-A-Pour Net Prices, Model AL50115EP. Date: before Jan. 1, 1998, 1 pg.

Putzmeister. TB 50 Extend-A-Pour brochure. Date: unknown, after Jun. 2, 1998, 6 pgs.

Putzmeister. Telebelt TB 50 brochure. Date: unknown, after Jun. 2, 1998, 6 pgs.

* cited by examiner

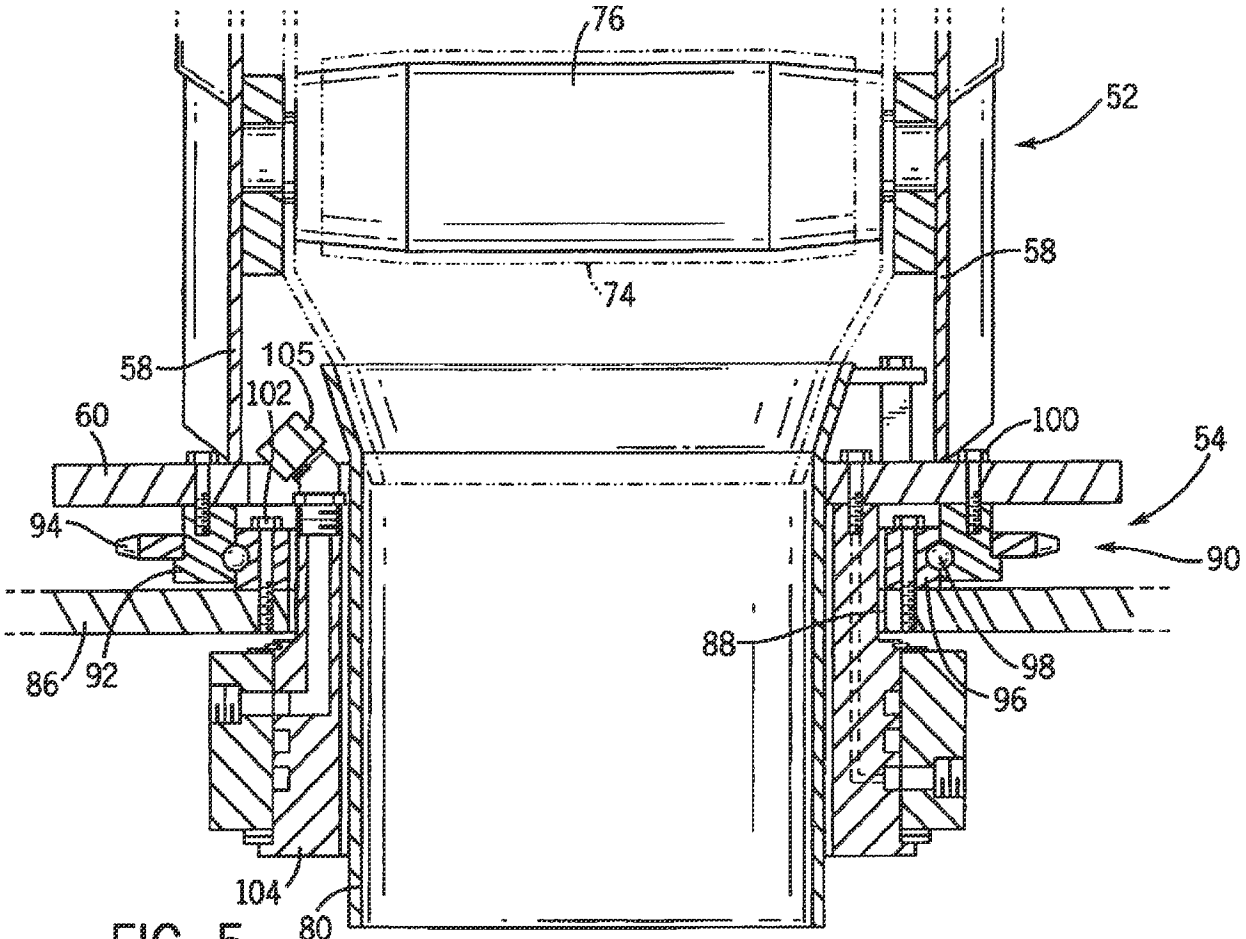
FIG. 5
Amended

VEHICLE-MOUNTED CONVEYOR SYSTEM INCLUDING POWERED ROTATING INFEED CONVEYOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to a self-propelled, vehicle-mounted conveyor system used to place concrete or other material in a desired location. More specifically, the present invention is a vehicle-mounted conveyor system that includes powered turntables and lifting mechanisms for both the discharge conveyor assembly and the infeed conveyor assembly.

Vehicle-mounted, extendible concrete conveyor systems, such as shown in U.S. Pat. No. 4,624,357, have been in use for some time. Vehicle-mounted conveyor systems of this type have been found to be very useful because the concrete, or other material, can be transferred to a location at the work site that may be located a considerable distance from the supply of the material. The vehicle mounted conveyor system has proven to be very useful since the entire conveyor system can be quickly and easily moved by simply moving the vehicle on which the conveyor system is mounted. The conveyor system not only can be moved around the work site, but also includes a discharge conveyor assembly having a telescoping boom that can be extended and retracted, rotated about a vertical axis, and elevated to considerable heights. The vehicle-mounted conveyor system identified above can be moved from a working position to a stowed position and the entire system can be transported over highways to travel between job sites.

The extendible discharge conveyor assembly of the conveyor system includes a moving discharge conveyor belt that is feed by a second, infeed conveyor assembly. One end of the infeed conveyor assembly is positioned on the ground and receives a supply of concrete from a ready-mix truck or other type of delivery means. The infeed conveyor assembly transfers the material onto the discharge conveyor belt, which transport the material to the desired point at the work site.

In currently available vehicle-mounted conveyor systems, the infeed conveyor assembly is mounted to a swivel mechanism above one end of the discharge conveyor assembly. The swivel mechanism allows the infeed conveyor assembly to be manually rotated about the stationary vehicle to position the infeed conveyor assembly near the ready-mix truck or other delivery means. Typically, the infeed end, or loading point, of the infeed conveyor assembly includes a supply hopper and relatively large wheels that allow the infeed conveyor assembly to be pulled or pushed along the ground at the work site. Although the loading point of the infeed conveyor assembly can be moved to the desired location, the infeed conveyor assembly is typically quite large and heavy, which makes manual movement of the infeed conveyor extremely difficult. Additionally, the unevenness of the ground at the work site makes the movement of the infeed conveyor assembly even more difficult and subject to damage.

Therefore, it is an object of the present invention to provide a vehicle-mounted conveyor system in which the infeed conveyor assembly is mounted to a powered, secondary turntable such that the infeed conveyor assembly can be rotated relative to the vehicle using mechanical power. It is a further object of the invention to provide the secondary turntable between the discharge end of the infeed conveyor assembly and a main turret mounted on the vehicle such that the secondary turntable can be operated to rotate the infeed conveyor assembly on the same vertical axis as the main turret. It is a further object of the present invention to provide a powered, primary turntable positioned between the main turret and the vehicle to rotate the main turret relative to the vehicle. Additionally, it is an object of the invention to permit independent operation of the primary turntable and the secondary turntable, such that rotation of the discharge conveyor assembly and rotation of the infeed conveyor assembly are independent from each other. It is a further object of the invention to provide mechanical lifting mechanisms, such as hydraulic cylinders, that are operable to independently raise and lower the infeed conveyor assembly and the discharge conveyor assembly.

SUMMARY OF THE INVENTION

The present invention is a vehicle-mounted conveyor system for moving concrete and other aggregate materials from a supply source to a desired location. The conveyor system of the present invention includes a discharge conveyor assembly pivotally mounted to a main turret, which in turn is rotatably mounted to the vehicle by a powered, primary turntable. The primary turntable is mechanically driven and includes controls that permit the user of the conveyor system to rotate the main turret about the vehicle. The discharge conveyor assembly includes a telescoping boom that is pivotally mounted in a cantilever manner to the main turret. A lifting cylinder is positioned between the telescoping boom and the main turret to raise and lower the telescoping boom. The lifting cylinder is preferably a hydraulic cylinder that can be operated by remote or vehicle-mounted controls to raise and lower the telescoping boom about a horizontal pivot axis passing through the main turret.

The discharge conveyor assembly further includes a driven discharge conveyor belt that extends between the ends of the telescoping boom. The discharge conveyor belt receives the desired material and transports the material along the telescoping boom to the discharge end of the discharge conveyor assembly. The speed of the discharge conveyor belt can be adjusted by remote or vehicle-mounted controls to supply the material to the discharge end at the desired rate.

The vehicle-mounted conveyor system includes an infeed conveyor assembly that receives the supply of material from a supply source, such as a ready-mix concrete truck, and transports the material from the supply source to the discharge conveyor assembly. The discharge end of the infeed conveyor assembly is pivotally mounted to a transfer turret, which is in turn rotatably mounted to the main turret by a powered, secondary turntable. Both the main turret and the transfer turret are rotatable about a common vertical axis of rotation. The secondary turntable is mechanically driven by a drive motor controlled by either vehicle-mounted controls or a remote control unit. When operated, the drive motor rotates the infeed conveyor assembly about 360° of continuous rotation in both the clockwise and counter-clockwise direction relative to the main turret. Powered rotation of the infeed conveyor assembly with respect to the main turret allows the user to mechanically adjust the position of the infeed end of the infeed conveyor assembly without manually moving the infeed assembly along the ground at the work site.

The primary turntable and secondary turntable are independently operable by the user such that the rotational position of the infeed conveyor assembly and the discharge conveyor assembly can be separately and independently adjusted by the user. The powered rotation of both the primary turntable and the secondary turntable, as well as the raising and lowering of both the infeed conveyor assembly and the discharge conveyor assembly, allows the user to mechanically adjust the position of the conveyor system of the present invention without the use of manual force.

The secondary turntable positioned between the infeed conveyor assembly and the main turret includes a chain sprocket fixed to a mounting plate of the transfer turret. The chain sprocket is part of a bearing assembly and is rotatable about an inner ring fixed to a support platform of the main turret. A drive motor is coupled to the chain sprocket by a drive chain that interacts with the individual teeth formed on the chain sprocket. The drive motor is preferably a hydraulic motor operable in both a forward and a reverse direction. Operation of the drive motor causes the chain sprocket and the joined transfer turret to rotate relative to the main turret to adjust the position of the infeed conveyor assembly.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 5 is an enlarged section view of the secondary turntable that couples the infeed conveyor assembly to the main turret.

DETAILED DESCRIPTION OF THE INVENTION

Figure 1:
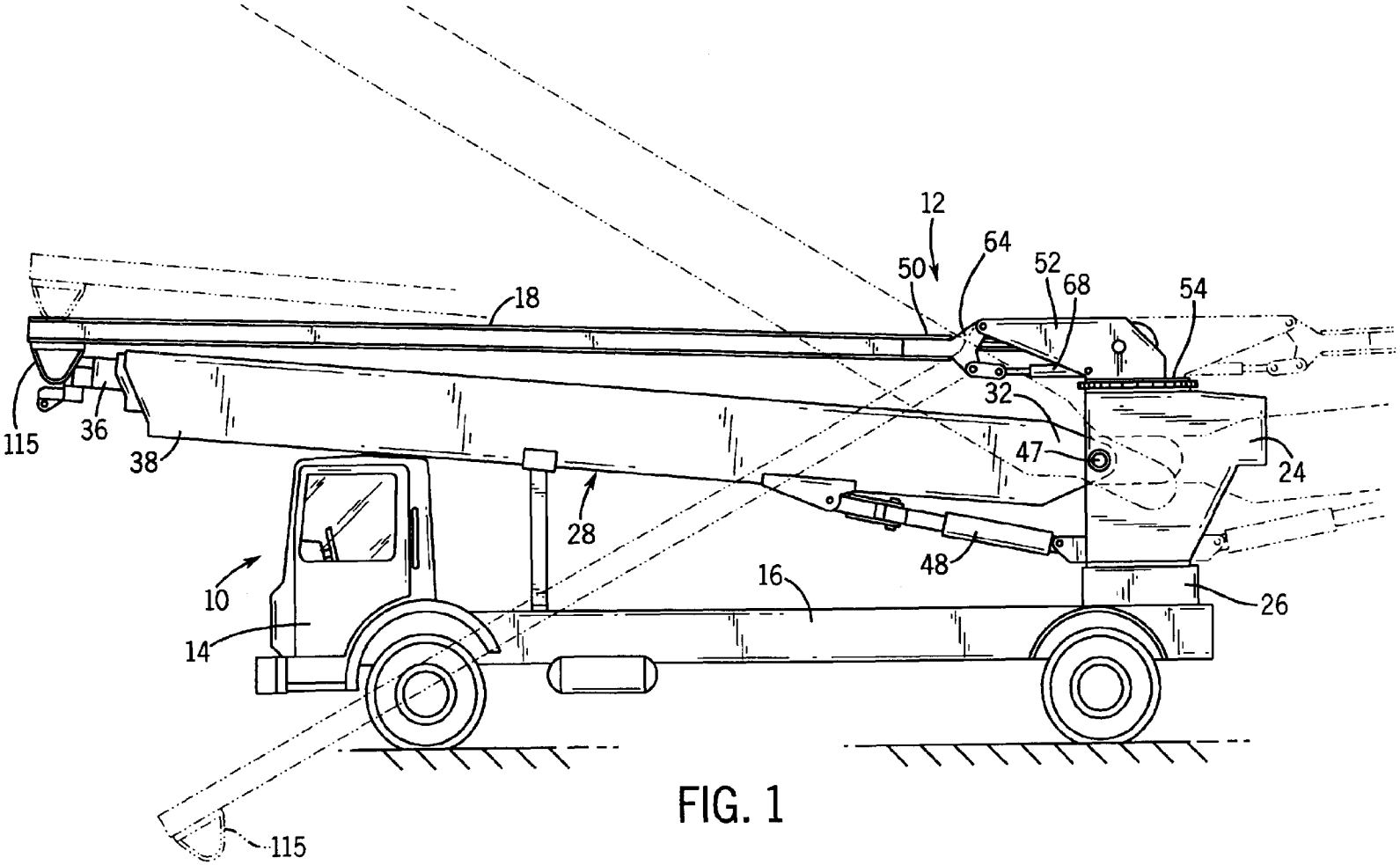
FIG. 1 is a side elevation view of a self-propelled vehicle including a vehicle-mounted conveyor system of the present invention.
Figure 2:
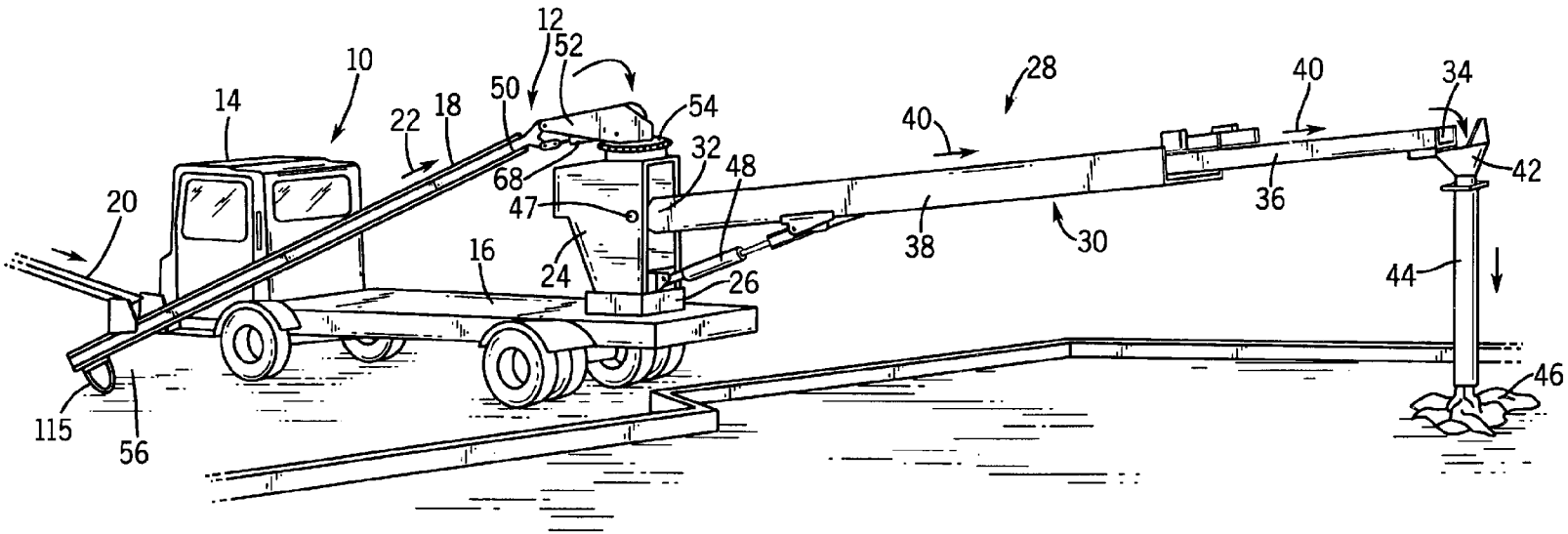
FIG. 2 is a perspective view of the vehicle-mounted conveyor system, shown transporting an aggregate material, such as concrete, from a supply source to its desired location.

A self-propelled vehicle 10 of the present invention including a vehicle-mounted conveyor system 12 for transporting an aggregate material, such as concrete, is best shown in FIGS. 1 and 2. The vehicle 10 includes a conventional cab 14 and a rear platform 16. The vehicle 10 is of a size and weight such that it does not exceed the legal dimensional limits for over the highway travel.

The conveyor system 12 includes an infeed conveyor assembly 18 that receives the supply of aggregate material, such as concrete, from a supply source 20 and transports the material upward along a moving infeed conveyor belt, as illustrated by arrow 22 in FIG. 2. The infeed conveyor assembly 18 is rotatable about the vehicle 10, as will be discussed below, such that the infeed conveyor assembly 18 can receive the supply of material at various locations around the vehicle 10.

The conveyor system 12 includes a main turret 24 mounted to the rear platform 16 of vehicle 10 by a primary turntable 26. The primary turntable 26 is mechanically driven by a drive motor to rotate the main turret 24 about a vertical axis in both a clockwise and counter-clockwise direction relative to the rear platform 16. In the preferred embodiment of the invention, the primary turntable 26 is driven by a hydraulic motor that can be operated by either vehicle-mounted controls or a remote control unit (not shown). The remote control unit allows the user to adjust the rotational position of the main turret 24 from a remote location on the job site.

A discharge conveyor assembly 28 is pivotally mounted to the main turret 24 about a horizontal pivot axis and also rotates along with the main turret 24 about the primary turntable 26. Specifically, the discharge conveyor assembly 28 includes a telescoping boom 30 having its base end 32 pivotally mounted in a cantilever manner to the main turret 24. The discharge end 34 of the telescoping boom 30 is contained on a feed section 36 that is extendible into and out of a base section 38 of the telescoping boom 30. Extension of the feed section 36 into and out of the base section 38 is also controlled by vehicle-mounted or remote controls. In the preferred embodiment of the invention, the telescoping boom 30 can also include an intermediate section (not shown) such that the discharge end 34 can be extended up to 128 feet from the main turret 24.

Both the feed section 36 and the base section 38 include moving discharge conveyor belts that transport the aggregate material from the base end 32 to the discharge end 34 of the telescoping boom 30, as illustrated by arrows 40. The supply of building material leaving the discharge end 34 is fed into a tremie 42 joined to an elephant trunk 44. The tremie 42 and elephant trunk 44 allow the aggregate material 46 to be deposited in a desired location at the work site.

In addition to being rotatable about the primary turntable 26, the telescoping boom 30 of the discharge conveyor assembly 28 can be raised and lowered about a horizontal pivot axis defined by a pair of pivot pins 47 by a hydraulic lift cylinder 48 connected between the main turret 24 and the base section 38 of the telescoping boom 30. The supply of hydraulic fluid to the lift cylinder 48 can be controlled either by vehicle-mounted controls (not shown) or by a remote control unit that allows the user to raise and lower the discharge conveyor assembly 28 from a remote location. In the preferred embodiment of the invention, the discharge conveyor assembly 28 can be lowered approximately 50 below horizontal and raised 30° above horizontal. Additionally, the speed of the discharge conveyor belts contained in both the feed section 36 and base section 38 of the telescoping boom 30 can also be controlled by vehicle-mounted controls or via a remote control unit.

As can be seen in FIGS. 1 and 2, discharge end 50 of the infeed conveyor assembly 18 is pivotally joined to a secondary transfer turret 52, which in turn is attached to a secondary turntable 54. The secondary turntable 54 is connected to a powered drive mechanism such that the secondary turntable 54 can be mechanically operated to rotate the infeed conveyor assembly 18 about a vertical axis common with the rotational axis of the main turret 24. The operation of the secondary turntable 54 can be controlled either by vehicle-mounted controls or controls contained on a remote control unit. The powered secondary turntable 54 allows the user to rotate the infeed conveyor assembly 18 in both the clockwise and counterclockwise direction around the rear platform 16 and about the main turret 24. In this manner, the user can use the powered movement of the infeed conveyor assembly 18 to position the infeed conveyor assembly 18 without having to manually pull the infeed end 56 along the ground at the work site. The details of the powered rotational connection, including the secondary turntable 54, between the infeed conveyor assembly 18 and the main turret 24 will be described in greater detail below.

Figure 3:
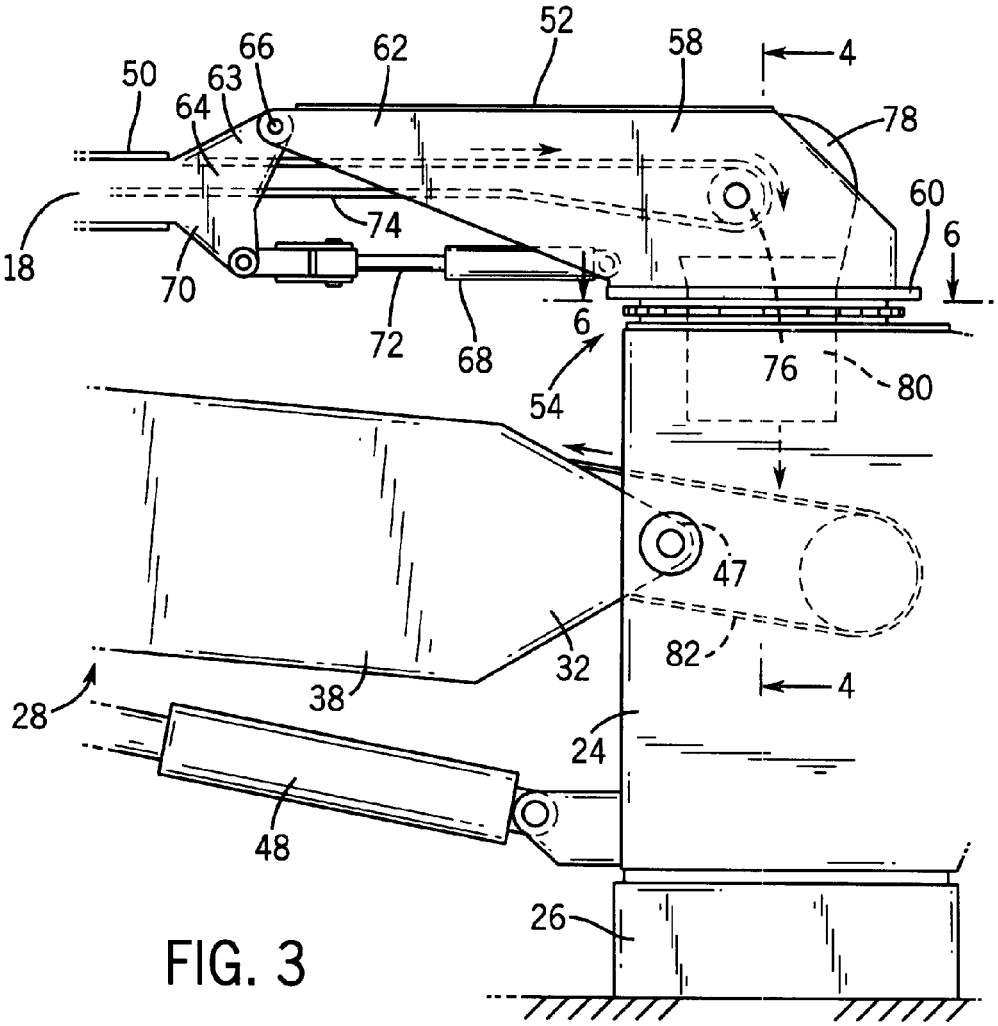
FIG. 3 is a partial side elevation view illustrating the mounting arrangement between the main turret and both the infeed conveyor assembly and the discharge conveyor assembly.
Figure 4:
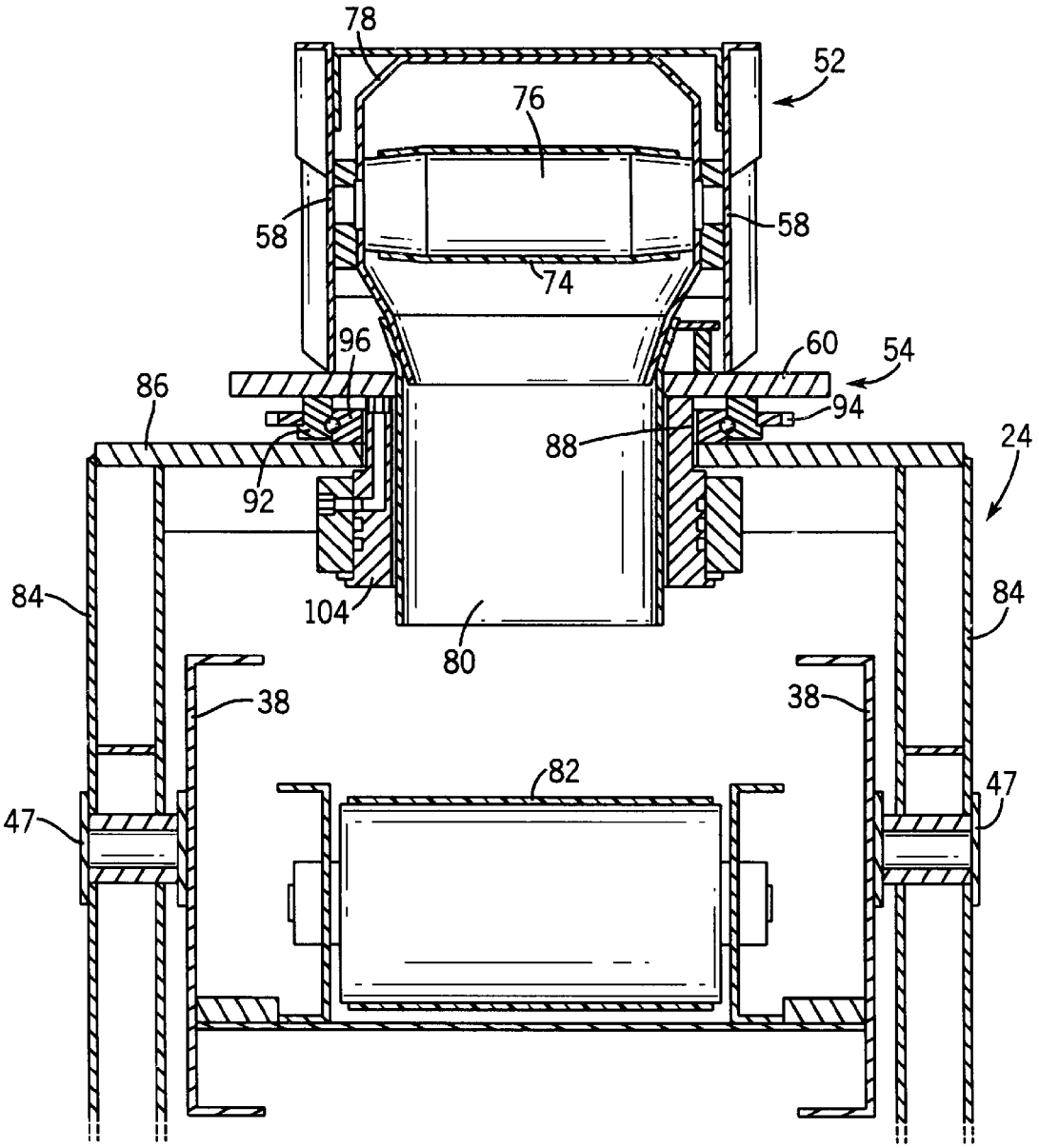
FIG. 4 is a partial section view taken along line 4—4 illustrating a secondary turntable that mounts the infeed conveyor assembly to the main turret.

Referring now to FIGS. 4 and 5, the transfer turret 52 includes a pair of spaced, vertical side supports 58 that are each connected at their lower end to a mounting plate 60. As shown in FIG. 3, each of the side supports 58 includes an extended portion 62 that extends horizontally from the top of the mounting plate 60. The spaced, extended portions 62 of each side support 58 pivotally receives an upper ear 63 of a mounting bracket 64 extending from the discharge end 50 of the infeed conveyor assembly 18. Specifically, a pivot pin 66 passes through both of the side supports 58 and the upper ear 63 of the mounting bracket 64 to provide a horizontal pivotal axis for the infeed conveyor assembly 18 with respect to the vertically fixed transfer turret 52.

As can be seen in FIG. 3, a hydraulic lift cylinder 68 is positioned between the transfer turret 52 and a lower ear 70 of the mounting bracket 64. Extension and retraction of cylinder rod 72 of the lift cylinder 68 causes the infeed conveyor assembly 18 to lower and raise with respect to the fixed vertical position of the transfer turret 52, as shown in phantom in FIG. 1. In the preferred embodiment of the invention, the infeed conveyor assembly 18 can be lowered up to 30° below horizontal and raised up to 5° above horizontal by the lift cylinder 68. The extension and retraction of the cylinder rod 72 within the lift cylinder 68 is controlled via either vehicle-mounted controls or the remote control unit. In this manner, the user can raise and lower the infeed conveyor assembly 18 to move the infeed conveyor assembly 18 between the operating position shown in FIG. 2 and the storage position shown in FIG. 1.

As can be seen in FIG. 3, the infeed conveyor assembly 18 includes an infeed conveyor belt 74 that is entrained between a series of rollers 76. The infeed conveyor belt 74 moves in the direction shown by the arrows in FIG. 3 to transport the aggregate material from the supply source 20 past the discharge end 50 of the feed conveyor assembly 18 and between the pair of spaced side supports 58 defining the transfer turret 52. Once the material reaches the last roller 76, as shown in FIG. 3, the material is guided by a transfer chute 78 downward through a transfer tremie 80 and onto a discharge conveyor belt 82 that moves the building material along the length of the discharge conveyor assembly 28.

Referring now to FIGS. 4 and 5, thereshown is the powered rotational mounting arrangement between the secondary transfer turret 52 and the main turret 24. As can be seen in FIG. 4, the main turret 24 is defined by a pair of spaced sidewalls 84 and a generally horizontal support platform 86 extending between and supported by the sidewalls 84. Referring now to FIG. 5, the support platform 86 includes a transfer opening 88 through which the transfer tremie 80 extends.

The transfer turret 52, to which the infeed conveyor assembly 18 is pivotally connected, is rotatable about the support platform 86 through the secondary turntable 54. The secondary turntable 54 includes a bearing assembly 90 including an outer, chain sprocket 92 including a plurality of individual sprocket teeth 94. The chain sprocket 92 is rotatable about a fixed inner race 96. A plurality of individual ball bearings 98 are positioned between the inner race 96 and the outer chain sprocket 92 to permit the chain sprocket 92 to rotate about the inner race 96. As can be seen in FIG. 5, a plurality of connectors 100, such as threaded bolts, pass through the mounting plate 60 to secure the chain sprocket 92 to the undersurface of the mounting plate 60. Likewise, a plurality of connectors 102 secure the inner race 96 to the support platform 86. The bearing assembly 90 allows the transfer turret 52 to rotate relative to the support platform 86 of the main turret 24.

As shown in FIG. 5, a hydraulic swivel 104, including hydraulic fittings [106] *105*, passes through the transfer opening 88 in the support platform 86 to permit hydraulic fluid to pass through the rotational connection between the main turret 24 and the transfer turret 52. The hydraulic fittings [106] *105* are connected to various hydraulic drive motors used in the operation of the infeed conveyor assembly 18.

Figure 6:
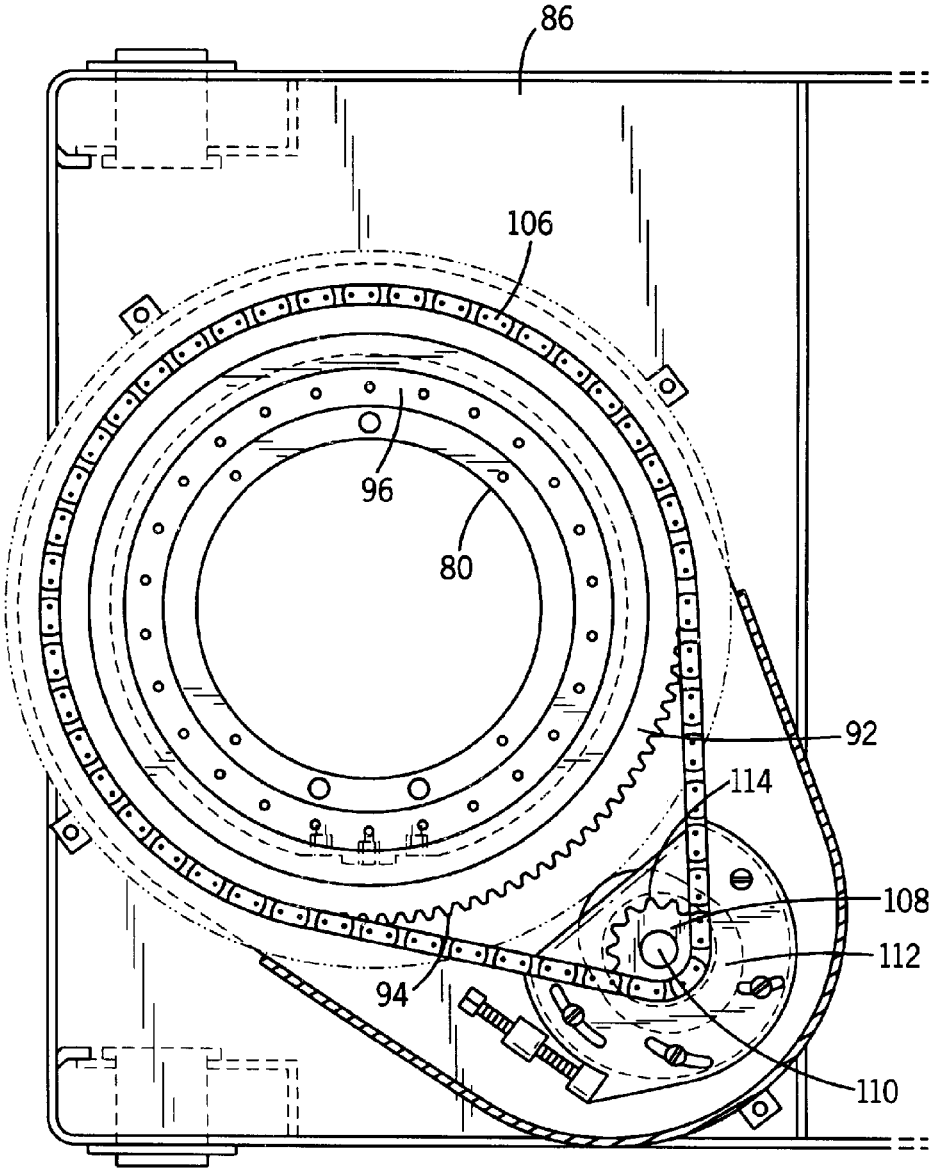
FIG. 6 is a section view taken along line 6—6 of FIG. 3 illustrating the drive assembly coupled to the secondary turntable to effect powered rotation of the infeed conveyor assembly about the main turret.

Referring now to FIG. 6, a drive chain 106 including a plurality of individual links surrounds the chain sprocket 92 and engages the plurality of sprocket teeth 94 formed along the outer circumference of the chain sprocket 92. The drive chain 106 also surrounds and engages a drive sprocket 108 attached to drive shaft 110 of a drive motor 112. In the preferred embodiment of the invention, the drive motor 112 is a bi-directional hydraulic drive motor. Operation of the hydraulic drive motor 112 is controlled by controls either on the vehicle 10 or on a remote control unit that is also used to control various other operational functions of the conveyor system 12.

When the drive motor 112 is operated, the drive motor 112 rotates the drive shaft 110 in the desired direction, which results in corresponding rotation of the drive sprocket 108. Spaced teeth 114 along the outer circumference of the drive sprocket 108 engage the links of the drive chain 106, which results in rotation of the chain sprocket 92. Since the chain sprocket 92 is fixed to the lower surface of the mounting plate 60, rotation of drive motor 112 results in corresponding rotational movement of the transfer turret 52 and the infeed conveyor assembly 18 relative to the support platform 86 of main turret 24.

Although the preferred embodiment of the secondary turntable 54 has been described as being driven by the hydraulic drive motor 112 coupled to a chain sprocket 92 through the drive chain 106, it is contemplated by the inventors that various other types of drive mechanisms could be used to mechanically rotate the infeed conveyor assembly 18. For example, it is contemplated that the secondary turntable 54 could be rotated by either a worm drive assembly or gear assembly coupled to either electric or pneumatic motors and controls. The specific type of drive mechanism coupled to the secondary turntable can be selected from numerous conventional systems currently available, as long as the infeed conveyor assembly 18 can be mechanically rotated relative to the main turret 24.

As can be understood from the foregoing description and the figures, the powered rotation of the infeed conveyor assembly 18 relative to the main turret 24 is carried out through the secondary turntable 54. Rotation of the infeed conveyor assembly 18 is independent from the rotation of the main turret 24 and the discharge conveyor assembly 28 about the primary turntable 26. Both the infeed conveyor assembly 18 and the discharge conveyor assembly 28 are rotatable about a common vertical axis and can be independently rotated to provide an infinitely variable operating range of 0° to 360° between the loading point of the infeed conveyor assembly 18 and the discharge point of the discharge conveyor assembly 28.

When the infeed conveyor assembly 18 is nested on top of the discharge conveyor assembly 28, as shown in FIG. 1, the infeed conveyor assembly 18 will rotate along with the discharge assembly 28 about the primary turntable 26. In a so conventional manner, the primary turntable 26 provides powered rotation of the main turret 24 and discharge conveyor assembly 28 about the rear platform 16 of the vehicle 10.

Referring now to FIG. 2, when the infeed conveyor assembly 18 is contained in the operative position, as shown in FIG. 2, the transfer turret 52 is freely rotatable relative to the main turret 24. Thus, if the main turret 24 and the attached discharge conveyor assembly 28 are rotated about the primary turntable 26, the rotational connection between the transfer turret 52 and the main turret 24 through the secondary turntable 54 allows the infeed end 56 of the infeed conveyor assembly 18 to remain stationary. Likewise, the infeed end 56 of the infeed conveyor assembly 18 can be rotated about the main turret 24 by the secondary turntable 54 without causing rotation of the main turret 24. As described above, both the discharge conveyor assembly 28 and the infeed conveyor assembly 18 are subject to powered rotation, independently from each other.

If the user of the vehicle 10 including the conveyor system 12 wishes to change the position of the infeed end 56 of the infeed conveyor assembly 18 due to a change in the position of the supply source 20, the user first activates the lift cylinder 68 to raise the self-leveling foot bracket 115 on the infeed end 56 off of the ground. Once the infeed end 56 is suspended above ground, the secondary turntable 54 is mechanically operated to rotate the infeed end 56 in the desired direction relative to the stationary rear platform 16 of the vehicle 12. As was previously discussed, the powered secondary turntable 54 can be operated to rotate the infeed end 56 of the infeed conveyor assembly 18 in either a clockwise or counter-clockwise direction. After the infeed end 56 is positioned in the desired location, the lift cylinder 68 is again operated to lower the infeed end 56, and specifically the foot bracket 115, back into contact with the ground at the work site. As can be understood by the foregoing description, the user can adjust the position of the infeed end 56 without any manual exertion.

Various alternatives and embodiments are contemplated as being within the scope of the following claims particularly pointing out and distinctly claiming the subject matter regarded as the invention.

We claim:

[1. A vehicle-mounted conveyor system for transporting material from a supply source to a desired location, the conveyor system comprising:

a mechanically driven primary turntable mounted on the vehicle;

a main turret mounted to the primary turntable for rotation relative to the vehicle;

a discharge conveyor assembly mounted to the main turret for rotation with the main turret, the discharge conveyor assembly including a telescoping boom pivotally mounted to the main turret for movement between a raised position and a lowered position;

a lift cylinder coupled to the discharge conveyor assembly to move the telescoping boom between the raised position and the lowered position;

a mechanically driven secondary turntable mounted to the main turret;

an infeed conveyor assembly mounted to the secondary turntable for rotation relative to the main turret, wherein the primary turntable and the secondary turntable are independently operable; and a second lift cylinder coupled to the infeed conveyor assembly to move the infeed conveyor assembly between a raised position and a lowered position, wherein the infeed conveyor assembly contacts the ground in the lowered position and is above horizontal in the raised position.]

[2. The conveyor system of claim 1 wherein the secondary turntable is coupled to a drive assembly operable to rotate the secondary turntable and the infeed conveyor assembly relative to the main turret.]

[3. The conveyor system of claim 2 wherein the drive assembly includes a hydraulic drive motor coupled to the secondary turntable.]

4. The conveyor system of claim [2] *11* wherein the infeed conveyor assembly and the discharge conveyor assembly are rotatable *with respect to the vehicle* about a common vertical axis.

5. The conveyor system of claim 4 wherein [the] powered rotation of the discharge conveyor assembly and the infeed conveyor assembly provide for an infinitely variable operating range of 0° to 360° between a loading point of the infeed conveyor assembly and a discharge point of the discharge conveyor assembly.

[6. A vehicle-mounted conveyor system for transporting material from a supply source to a desired location, the conveyor system comprising:

a powered primary turntable mounted to the vehicle;

a main turret mounted to the primary turntable for rotation relative to the vehicle;

a discharge conveyor assembly mounted to the main turret for rotation with the main turret, the discharge conveyor assembly including a discharge conveyor belt mounted within a telescoping boom pivotally mounted to the main turret for movement between a raised position and a lowered position;

a powered secondary turntable mounted to the main turret, the secondary turntable being coupled to a powered drive motor;

an infeed conveyor assembly mounted to the secondary turntable for rotation relative to the main turret, the infeed conveyor assembly including an infeed conveyor belt operable to transport the material from the supply source to the discharge conveyor assembly, wherein operation of the drive motor rotates the infeed conveyor assembly relative to the main turret; and a lift cylinder coupled to the infeed conveyor assembly to move the infeed conveyor assembly between a raised position and a lowered position, wherein the infeed conveyor assembly contacts the ground in the lowered position and is above horizontal in the raised position.]

[7. The conveyor system of claim 6 wherein the primary turntable and the secondary turntable are independently operable.]

8. [The] *A vehicle-mounted conveyor system for transporting material from a supply source to a desired location, the* conveyor system [of claim 6 further] comprising*:*

*a powered primary turntable mounted to the vehicle;*

*a main turret mounted to the primary turntable for rotation relative to the vehicle;*

*a discharge conveyor assembly mounted to the main turret for rotation with the main turret, the discharge conveyor assembly including a discharge conveyor belt mounted within a telescoping boom pivotally mounted to the main turret for movement between a raised position and a lowered position;*

*a powered secondary turntable which is (a) mounted to the main turret and (b) coupled to a powered drive motor, the secondary turntable having a transfer turret attached thereto;*

*an infeed conveyor assembly pivotally joined to the transfer turret and rotatable relative to the main turret, the infeed conveyor assembly including an infeed conveyor belt operable to transport the material from the supply*

*source to the discharge conveyor assembly, wherein operation of the drive motor rotates the infeed conveyor assembly relative to the main turret;*

*a lift cylinder positioned between the infeed conveyor assembly and the transfer turret to move the infeed conveyor assembly between a raised position and a lowered position, wherein the infeed conveyor assembly contacts the ground in the lowered position and is above horizontal in the raised position; and* a transfer tremie positioned to direct material from the infeed conveyor assembly to the discharge conveyor assembly, the transfer tremie passing through the secondary turntable.

9. The conveyor system of claim [6] *8* wherein the infeed conveyor assembly and the discharge conveyor assembly are rotatable *with respect to the vehicle* about a common vertical axis.

10. The conveyor system of claim 9 wherein [the] powered rotation of the discharge conveyor assembly and the infeed conveyor assembly provide for an infinitely variable operating range of 0° to 360° between a loading point of the infeed conveyor assembly and a discharge point of the discharge conveyor assembly.

11. [The] *A vehicle-mounted conveyor system for transporting material from a supply source to a desired location, the* conveyor system [of claim 6 wherein] *comprising:*

*a powered primary turntable mounted to the vehicle;*

*a main turret mounted to the primary turntable for rotation relative to the vehicle;*

*a discharge conveyor assembly mounted to the main turret for rotation with the main turret, the discharge conveyor assembly including a discharge conveyor belt mounted within a telescoping boom pivotally mounted to the main turret for movement between a raised position and a lowered position;*

*a powered secondary turntable which is (a) mounted to the main turret and (b) coupled to a powered drive motor, the secondary turntable having a transfer turret attached thereto; transfer turret and rotatable*

*an infeed conveyor assembly pivotally joined to the transfer turret and rotatable relative to the main turret, the infeed conveyor assembly including an infeed conveyor belt operable to transport the material from the supply source to the discharge conveyor assembly, wherein operation of the drive motor rotates the infeed conveyor assembly relative to the main turret,* the secondary turntable [includes] *including* a bearing assembly [including] *having* a chain sprocket coupled to the infeed conveyor assembly and an inner ring coupled to the main turret, the chain sprocket being rotatable about the inner ring*; and*

*a lift cylinder positioned between the infeed conveyor assembly and the transfer turret to move the infeed conveyor assembly between a raised position and a lowered position, wherein the infeed conveyor assembly contacts the ground in the lowered position and is above horizontal in the raised position.*

12. The conveyor system of claim 11 wherein the chain sprocket includes a plurality of spaced teeth positioned around the outer circumference of the chain sprocket.

*13. The conveyor system of claim 8 further including a rotating hydraulic power connection and wherein the powered drive motor is a hydraulic motor.*

*14. The conveyor system of claim 11 further including a rotating hydraulic power connection and wherein the powered drive motor is a hydraulic motor.*

* * * * *